(12) United States Patent
Ogiwara et al.

(10) Patent No.: US 7,068,945 B2
(45) Date of Patent: Jun. 27, 2006

(54) OPTICAL AMPLIFYING AND REPEATING METHOD AND OPTICAL AMPLIFYING AND REPEATING SYSTEM

(75) Inventors: Hiroshi Ogiwara, Kawasaki (JP); Kenji Ota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/136,707

(22) Filed: May 25, 2005

(65) Prior Publication Data

US 2005/0226614 A1 Oct. 13, 2005

Related U.S. Application Data (63) Continuation of application No. PCT/JP03/01262, filed on Feb. 6, 2003.

(51) Int. Cl.
*H04B 10/02* (2006.01)
(52) U.S. Cl. .................. 398/173; 398/37; 398/28; 398/177; 385/24
(58) Field of Classification Search .................. 398/37, 398/28, 173, 175, 177, 180
See application file for complete search history.

(56) References Cited

U.S. PATENT DOCUMENTS

| | | | | |
|---|---|---|---|---|
| 2,267,792 | A * | 12/1941 | Geibig et al. | 148/201 |
| 5,923,453 | A * | 7/1999 | Yoneyama | 398/34 |
| 6,101,025 | A | 8/2000 | Naganuma | |
| 6,236,777 | B1 * | 5/2001 | Ravasio et al. | 385/24 |
| 6,301,404 | B1 * | 10/2001 | Yoneyama | 385/24 |
| 6,711,359 | B1 * | 3/2004 | Duff et al. | 398/178 |
| 2002/0131696 | A1 * | 9/2002 | Yokoyama et al. | 385/27 |

FOREIGN PATENT DOCUMENTS

| | | |
|---|---|---|
| GB | 2267792 A * | 2/1993 |
| GB | 2267792 | 12/1993 |
| JP | 5-336042 | 12/1993 |
| JP | 9-93201 | 4/1997 |
| JP | 9-116502 | 5/1997 |
| JP | 9-236513 | 9/1997 |
| JP | 10-229366 | 8/1998 |
| JP | 2000-31907 | 1/2000 |
| JP | 2001-502422 | 2/2001 |
| JP | 2001-505312 | 4/2001 |
| JP | 2001-148665 | 5/2001 |
| JP | 2002-171223 | 6/2002 |

* cited by examiner

OTHER PUBLICATIONS

Shigeyuki Akiba, et al., "Submarine Cable Network Systems", pp. 158-162.

*Primary Examiner*—Kenneth Vanderpuye
*Assistant Examiner*—Ken Malkowski
(74) *Attorney, Agent, or Firm*—Staas & Halsey LLP (57) ABSTRACT

A method includes taking backscattering light of a first wavelength in a first direction of a first transmission line and coupling the same so that the light may travel in a second direction of a second transmission line; taking a second wavelength in the first direction of the first transmission line and coupling the same so that the second wavelength may travel in the first direction of the second transmission line; taking backscattering light of the first wavelength in the second direction of the second transmission line and coupling the same so that the backscattering light may travel in the first direction of the first transmission line; taking the second wavelength in the second direction of the second transmission line and coupling the same so that the second wavelength may travel in the second direction of the first transmission line.

16 Claims, 8 Drawing Sheets

OPTICAL AMPLIFYING AND REPEATING METHOD AND OPTICAL AMPLIFYING AND REPEATING SYSTEM

CROSS-REFERENCE TO RELATED APPLICATION

This application is a U.S. continuation application filed under 35 USC 111(a) claiming benefit under 35 USC 120 and 3.65(c) of PCT application JP03/01262, filed Feb. 6, 2003, which is hereby incorporated herein by reference.

BACKGROUND OF THE INVENTION

1. Field of the Invention

The present invention relates to an optical amplifying and repeating method and an optical amplifying and repeating system, and, in particular, to an optical amplifying and repeating method and an optical amplifying and repeating system suitable to monitor a loss distribution in an optical transmission line in a longitudinal direction by means of OTDR (Optical Time Domain Reflectometry; optical pulse test).

2. Description of the Related Art

As a method of monitoring a loss distribution in a longitudinal direction of an optical fiber transmission line, OTDR including coherent OTDR is common (for example, see patent document 1 or non-patent document 1).

In a system including an optical amplifying and repeating unit in an optical transmission line, an optical isolator is required in an optical amplifier in terms of avoiding multi-path reflection. However, since backscattering light is blocked by the optical isolator in the optical amplifier, it is not possible to carry out OTDR in a condition in which the optical amplifier having the optical isolator built therein is inserted.

Figure 1:
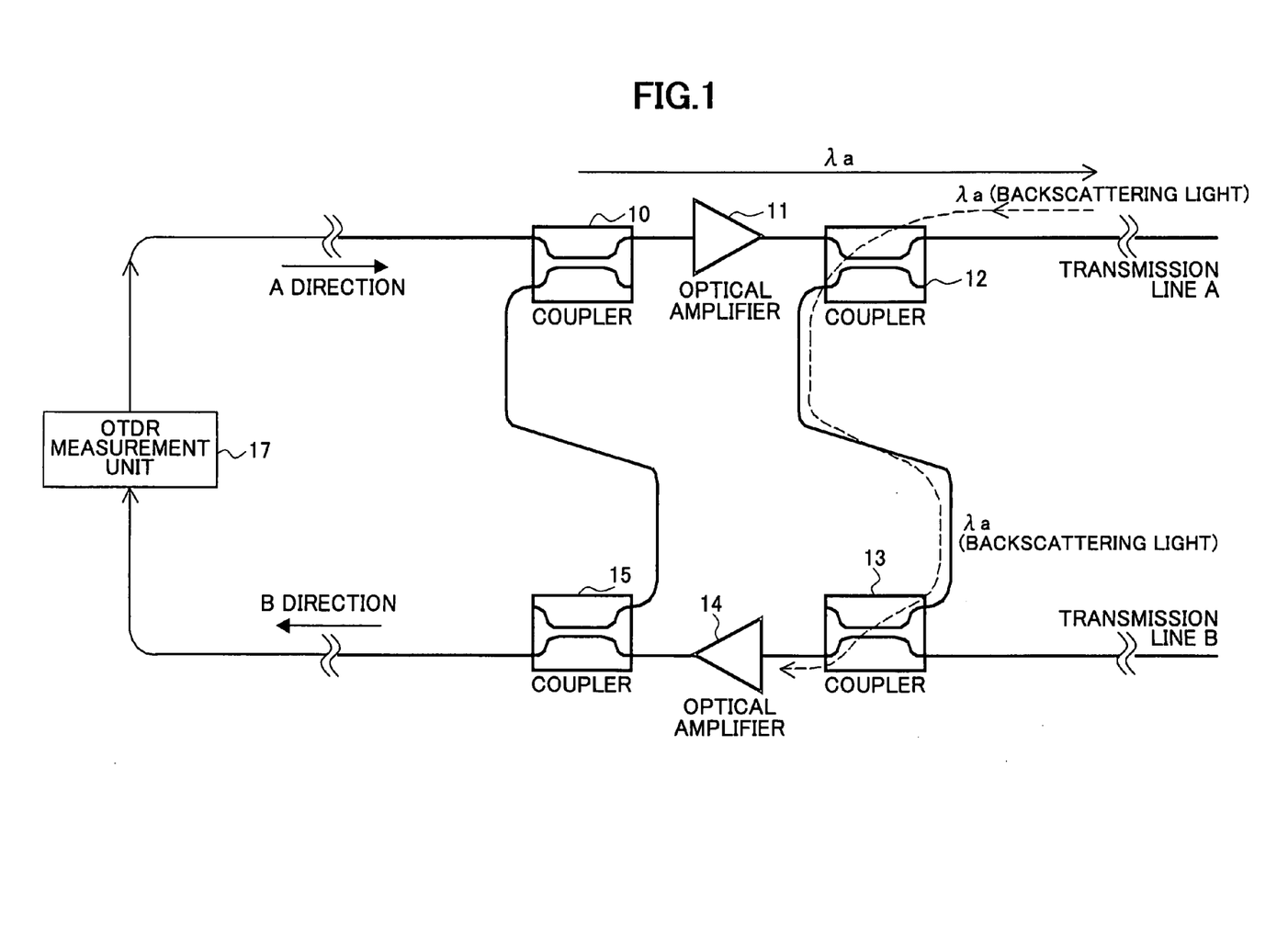
FIG. 1 is a configuration diagram of one example of an optical amplifying and repeating system in the prior art.

FIG. 1 shows one example of a configuration of the optical amplifying and repeating unit system in the prior art. In the figure, a wavelength $\lambda a$, transmitted from an A station, and traveling in an A direction (a direction in which light travels from the A station to a B station) from the A station in a transmission line A (a transmission line in which light travels from the A station to the B station), passes through an optical coupler 10, an optical amplifier 11 and an optical coupler 12, travels in the A direction in the transmission line A, and then, is transmitted to the station B. A wavelength $\lambda b$, transmitted from the B station and traveling in the B direction (a direction in which light travels from the B station to the A station) from the B station in a transmission line B (a transmission line in which light travels from the B station to the A station), passes through an optical coupler 13, an optical amplifier 14 and an optical coupler 15, travels in the B direction in the transmission line B, and then, is transmitted to the station A. The above-mentioned optical coupler 10, optical amplifier 11, optical coupler 12, optical coupler 13, optical amplifier 14 and optical coupler 15 are disposed on an optical amplifying and repeating unit.

Backscattering light of the wavelength $\lambda a$ is provided to the light transmission line B from the coupler 12 and via the coupler 13, then travels in the B direction there, and is monitored by an OTDR measurement unit 17 provided in the A station. Backscattering light of the wavelength $\lambda b$ is provided to the light transmission line A from the coupler 15 via the coupler 10, then travels in the A direction there, and is monitored by an OTDR measurement unit, not shown, provided in the B station.

In OTDR known from patent documents 2, 3, 4, 5 or such, as illustrated with reference to FIG. 1, only a loss distribution in a longitudinal direction of the optical transmission line A can be monitored from the A station, and, it is not possible to monitor a loss distribution in a longitudinal direction of the optical transmission line B (opposite line) from the A station. Similarly, only the loss distribution in the longitudinal direction of the optical transmission line B can be monitored from the B station and, it is not possible to monitor the loss distribution in the longitudinal direction of the optical transmission line A (opposite line) from the B station.

Patent document 1: Japanese Laid-open Patent Application No. 9-236513;
Patent document 2: Japanese Laid-open Patent Application No. 10-229366;
Patent document 3: Japanese Laid-open Patent Application No. 9-116502;
Patent document 4: Japanese Laid-open Patent Application No. 2001-505312;
patent document 5: Japanese Laid-open Patent Application No. 2001-502422; and
Non-patent document 1: Submarine Cable Network Systems, written by Shigeyuki Akiba and Naruhito Nishi together, issued by NTT Quality Co., Ltd.

If the loss distributions in both A and B directions can be monitored from the A station (or the B station), it is possible to reduce facilities required for a maintenance of the optical transmission lines and a manpower concerning the maintenance. Also, for a system having a long repeating span of optical amplifying and repeating unit, a high dynamic range is required for the OTDR measurement. If the loss distributions in both directions of the transmission lines A and B can be monitored from both A and B stations, it is possible to achieve the dynamic range double that of the prior art by monitoring the half span of the transmission line A and the transmission line B on the side of A from the A station while monitoring the half span of the transmission line A and the transmission line B on the side of B from the B station. However, in the prior art, the above-mentioned improvement of the maintenance or improvement of the dynamic range cannot be achieved.

SUMMARY OF THE INVENTION

A general object of the present invention is to provide an optical amplifying and repeating method and an optical amplifying and repeating system by which it is possible to monitor loss distributions of optical transmission lines in both directions, as well as it is possible to improve a maintenance and improve a dynamic range.

In order to achieve the object, the present invention is configured, in an optical amplifying and repeating method for connecting between a first station and a second station with a first optical transmission line and a second optical transmission line, wherein the first optical transmission line transmits an optical signal in a first direction from the first station toward the second station and includes at least one first optical amplifier on the way; and the second optical transmission line transmits an optical signal in a second direction from the second station toward the first station and includes at least one second optical amplifier on the way, to take backscattering light of a first wavelength traveling in the first direction of the first optical transmission line, immediately after the first optical amplifier, and couple the same in such a manner that the backscattering light may travel in the second direction of the second optical transmission line; to take a second wavelength traveling in the first direction of the first optical transmission line and couple the same in such a manner that the second wavelength may travel in the first direction of the second optical transmission line; to take backscattering light of the first wavelength traveling in the second direction of the second optical transmission line, immediately after the second optical amplifier, and couple the same in such a manner that said backscattering light may travel in the first direction of the first optical transmission line; and to take the second wavelength traveling in the second direction of the second optical transmission line and couple the same in such a manner that the second wavelength may travel in the second direction of the first optical transmission line.

By this optical amplifying and repeating method, it is possible to monitor loss distributions of optical transmission lines in both directions, and it is possible to improve maintenance and improve a dynamic range.

DETAILED DESCRIPTION OF THE PREFERRED EMBODIMENTS

Embodiments of the present invention are described now based on figures.

Figure 2:
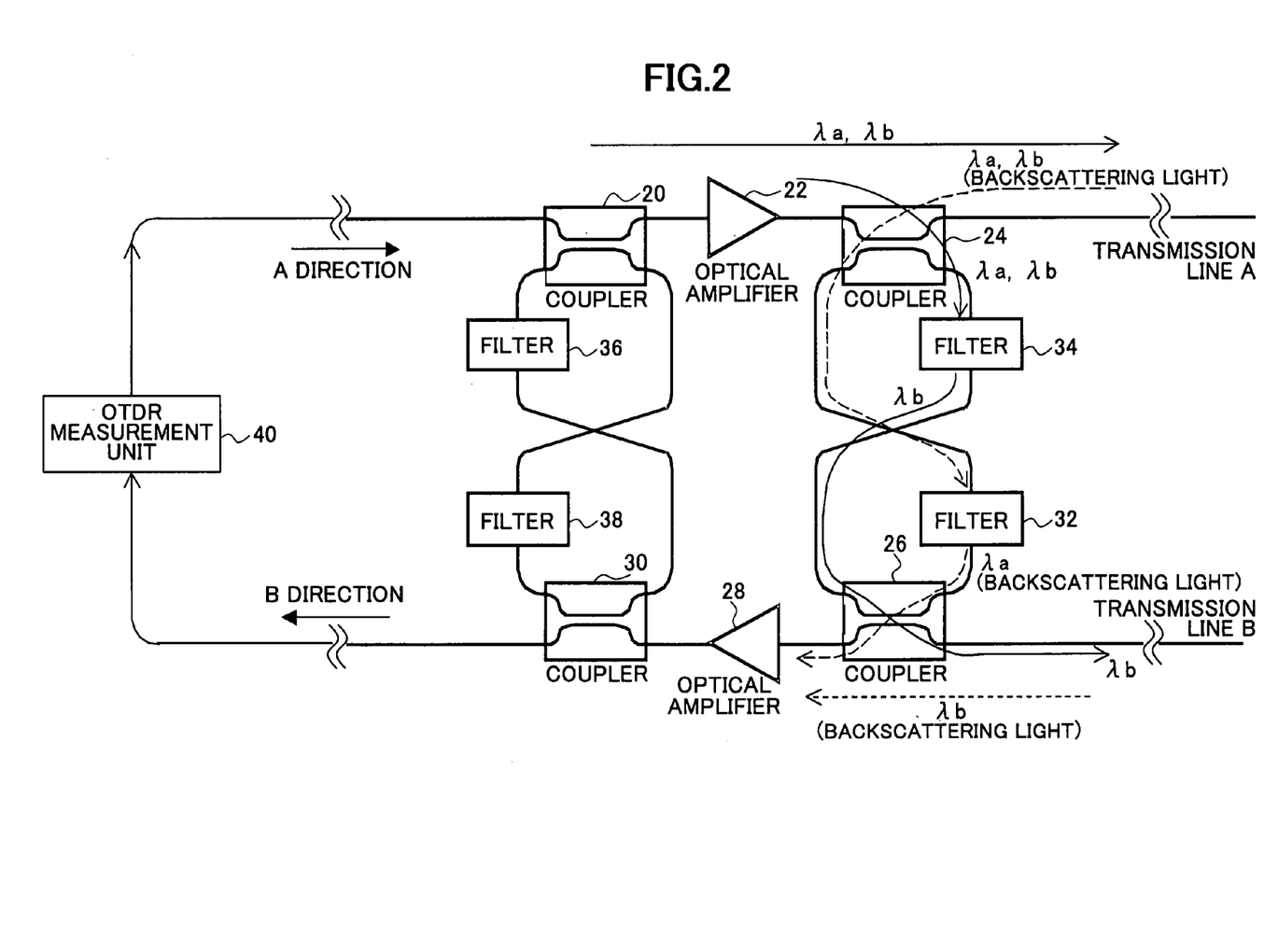
FIG. 2 is a configuration diagram of a first embodiment of an optical amplifying and repeating system according to the present invention.

FIG. 2 shows a configuration of a first embodiment of an optical amplifying and repeating system according to the present invention. In the figure, wavelengths $\lambda a$ and $\lambda b$ traveling in an A direction (a direction in which light travels from an A station to a B station) in a transmission line A (a transmission line in which light travels from the A station to the B station) after being transmitted from the A station passes through an optical coupler 20, an optical amplifier 22 and an optical coupler 24, further travels in the A direction in the transmission line A, and is transmitted to the B station. Further, wavelengths $\lambda a$ and $\lambda b$ traveling in a B direction (a direction in which light travels from the B station to the A station) in a transmission line B (a transmission line in which light travels from the B station to the A station) after being transmitted from the B station passes through an optical coupler 26, an optical amplifier 28 and an optical coupler 30, further travels in the B direction in the transmission line B, and is transmitted to the A station.

Backscattering light of the wavelength $\lambda a$ transmitted from the A station in the transmission line A is taken from the transmission line A by means of the optical coupler 24 immediately after the optical amplifier 22, and is coupled in the optical transmission line B (opposite line) immediately before the optical amplifier 28 through an optical filter 32 which passes therethrough only the wavelength $\lambda a$ (or blocks the wavelength $\lambda b$), in such a manner as to travel in the direction B of the transmission line B by means of the optical coupler 26.

The wavelength $\lambda b$ transmitted from the A station to the transmission line A is taken from the transmission line A by means of the optical coupler 24, and is coupled in the optical transmission line B (opposite line) immediately before the optical amplifier 28 through an optical filter 34 which passes therethrough only the wavelength $\lambda b$ (or blocks the wavelength $\lambda a$) in such a manner that the wavelength $\lambda b$ travels in the direction A of the transmission line B by means of the optical coupler 26. Backscattering light of the wavelength $\lambda b$ coupled in the A direction of the transmission line B, travels in the transmission line B in the B direction.

Thereby, it is possible to monitor a longitudinal directional loss distribution in both directions of the transmission lines A and B by means of the OTDR measurement unit 40 by transmitting the wavelengths $\lambda a$ and $\lambda b$ in the direction A of the transmission line A from the OTDR measurement unit 40 of the A station.

Similarly, backscattering light of the wavelength $\lambda a$ transmitted from the B station in the transmission line B is taken from the transmission line B by means of the optical coupler 30 immediately after the optical amplifier 28, and is coupled in the optical transmission line A (opposite line) immediately before the optical amplifier 22 through an optical filter 36 which passes therethrough only the wavelength $\lambda a$ (or blocks the wavelength $\lambda b$) in such a manner as to travel in the direction A of the transmission line A by means of the optical coupler 20.

The wavelength $\lambda b$ transmitted from the B station to the transmission line B is taken from the transmission line B by means of the optical coupler 30, and is coupled in the optical transmission line A (opposite line) immediately before the optical amplifier 22 through an optical filter 38 which passes therethrough only the wavelength $\lambda b$ (or blocks the wavelength $\lambda a$) in such a manner that the wavelength $\lambda b$ travels in the direction B of the transmission line A by means of the optical coupler 20. Backscattering light of the wavelength $\lambda b$ coupled in the B direction of the transmission line A travels in the transmission line A in the A direction. The above-mentioned optical couplers 20, 24, 26, 30, optical amplifiers 22, 28, optical filters 32 through 38 are disposed in an optical amplifying and repeating unit.

Thereby, it is possible to monitor a longitudinal directional loss distribution in both directions of the transmission lines A and B by means of an OTDR measurement unit of the B station, not shown, by transmitting the wavelengths $\lambda a$ and $\lambda b$ in the direction B of the transmission line B from the OTDR measurement unit of the B station.

In this optical amplifying and repeating system, the optical coupler in each of the input and output sides may be configured may be of two stages, monitoring PDs may be added, and thereby, it is possible to monitor input/output power of the optical amplifiers.

Figure 3:
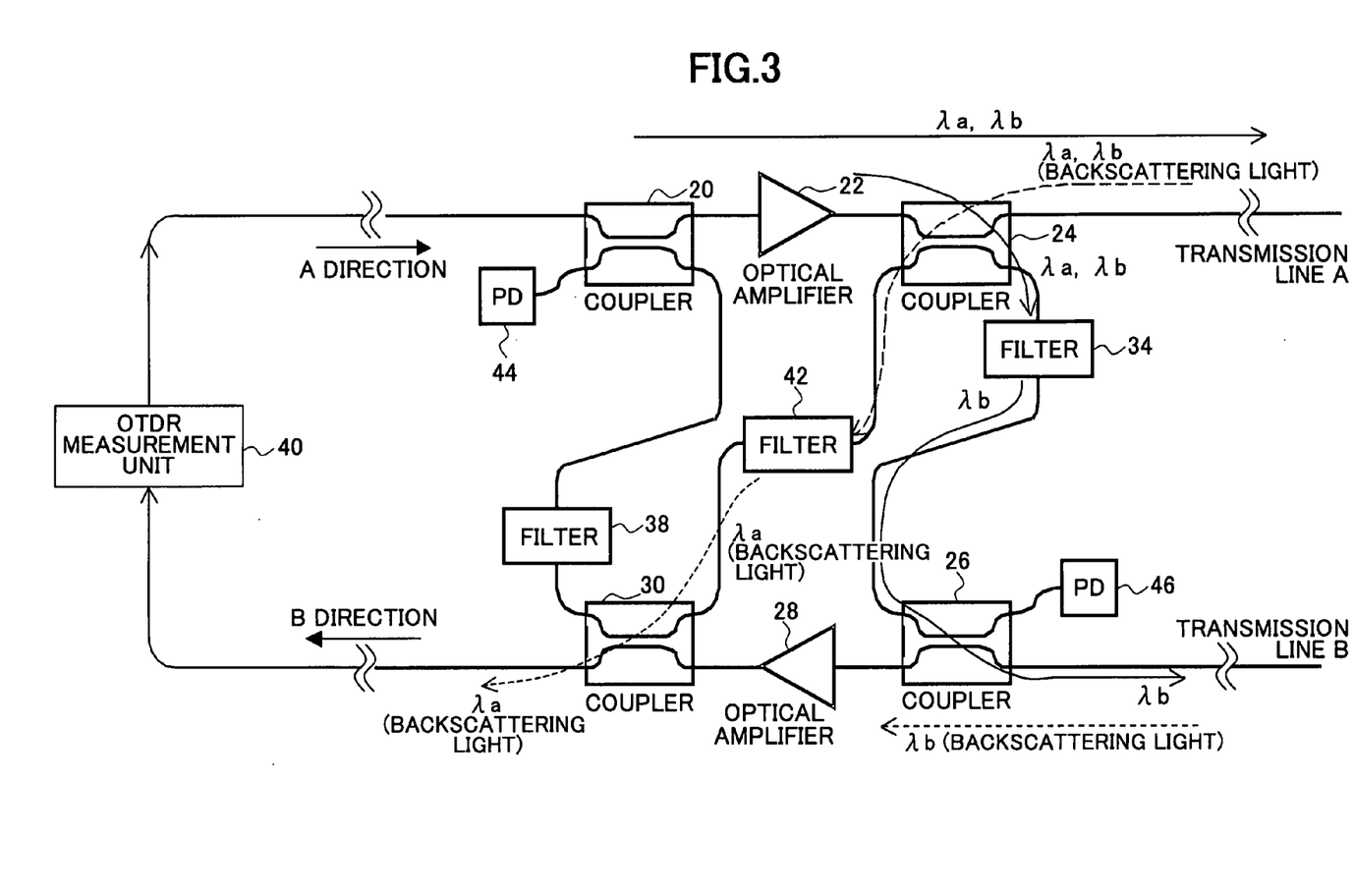
FIG. 3 is a configuration diagram of a second embodiment of an optical amplifying and repeating system according to the present invention.

FIG. 3 shows a configuration of a second embodiment of an optical amplifying and repeating system according to the present invention. In the figure, the same reference numerals are given to the same parts/components as those of FIG. 2. In FIG. 3, wavelengths λa and λb traveling in an A direction in a transmission line A after being transmitted from the station A passes through an optical coupler 20, an optical amplifier 22 and an optical coupler 24, further travels in the A direction in the transmission line A, and then is transmitted to the B station. Further, wavelengths λa and λb traveling in a B direction in a transmission line B after being transmitted from the station B passes through an optical coupler 26, an optical amplifier 28 and an optical coupler 30, further travels in the B direction in the transmission line B, and then is transmitted to the A station.

Backscattering light of the wavelength λa transmitted from the A station in the transmission line A is taken from the transmission line A by means of the optical coupler 24 immediately after the optical amplifier 22, and is coupled in the optical transmission line B (opposite line) immediately after the optical amplifier 28 through an optical filter 42 which passes therethrough only the wavelength λa (or blocks the wavelength λb) in such a manner as to travel in the direction B of the transmission line B by means of the optical coupler 30.

The wavelength λb transmitted from the A station to the transmission line A is taken from the transmission line A by means of the optical coupler 24, and is coupled in the optical transmission line B (opposite line) immediately before the optical amplifier 28 through an optical filter 34 which passes therethrough only the wavelength λb (or blocks the wavelength λa) in such a manner that the wavelength λb travels in the direction A of the transmission line B by means of the optical coupler 26. Backscattering light of the wavelength λb coupled in the A direction of the transmission line B travels in the transmission line B in the B direction.

Thereby, it is possible to monitor a longitudinal directional loss distribution in both directions of the transmission lines A and B by means of the OTDR measurement unit 40 of the A station by transmitting the wavelengths λa and λb in the direction A of the transmission line A from the OTDR measurement unit 40.

Backscattering light of the wavelength λa transmitted from the B station in the transmission line B is taken from the transmission line B by means of the optical coupler 30 immediately after the optical amplifier 28, and is coupled in the optical transmission line A (opposite line) immediately after the optical amplifier 22 through the optical filter 42 which passes therethrough only the wavelength λa (or blocks the wavelength λb) in such a manner as to travel in the direction A of the transmission line A by means of the optical coupler 24.

The wavelength λb transmitted from the B station to the transmission line B is taken from the transmission line B by means of the optical coupler 30, and is coupled in the optical transmission line A (opposite line) immediately before the optical amplifier 22 through an optical filter 38 which passes therethrough only the wavelength λb (or blocks the wavelength λa) in such a manner that the wavelength λb travels in the direction B of the transmission line A by means of the optical coupler 20. Backscattering light of the wavelength λb coupled in the B direction of the transmission line A travels in the transmission line A in the A direction.

Thereby, it is possible to monitor a longitudinal directional loss distribution in both directions of the transmission lines A and B by means of an OTDR measurement unit of the B station, not shown, by transmitting the wavelengths λa and λb in the direction B of the transmission line B from the OTDR measurement unit of the B station.

In this embodiment, in comparison to the first embodiment, it is possible to eliminate one filter. However, the backscattering light of the wavelength λa is not amplified by the optical amplifier 22 or 28. Further, by configuring the optical filters 34 and 38 so that they may have characteristics to pass therethrough the wavelength λb with reflecting wavelengths other than the wavelength λb, it is possible to add photodiodes (PD) 44 and 46 to remaining ports of the optical couplers 20 and 26, it is possible to detect input power of the respective ones of the optical amplifiers 22 and 28 by means of the photodiodes 44 and 46, and the detection outputs can be utilized for gain control of the optical amplifiers 22 and 28.

Figure 4:
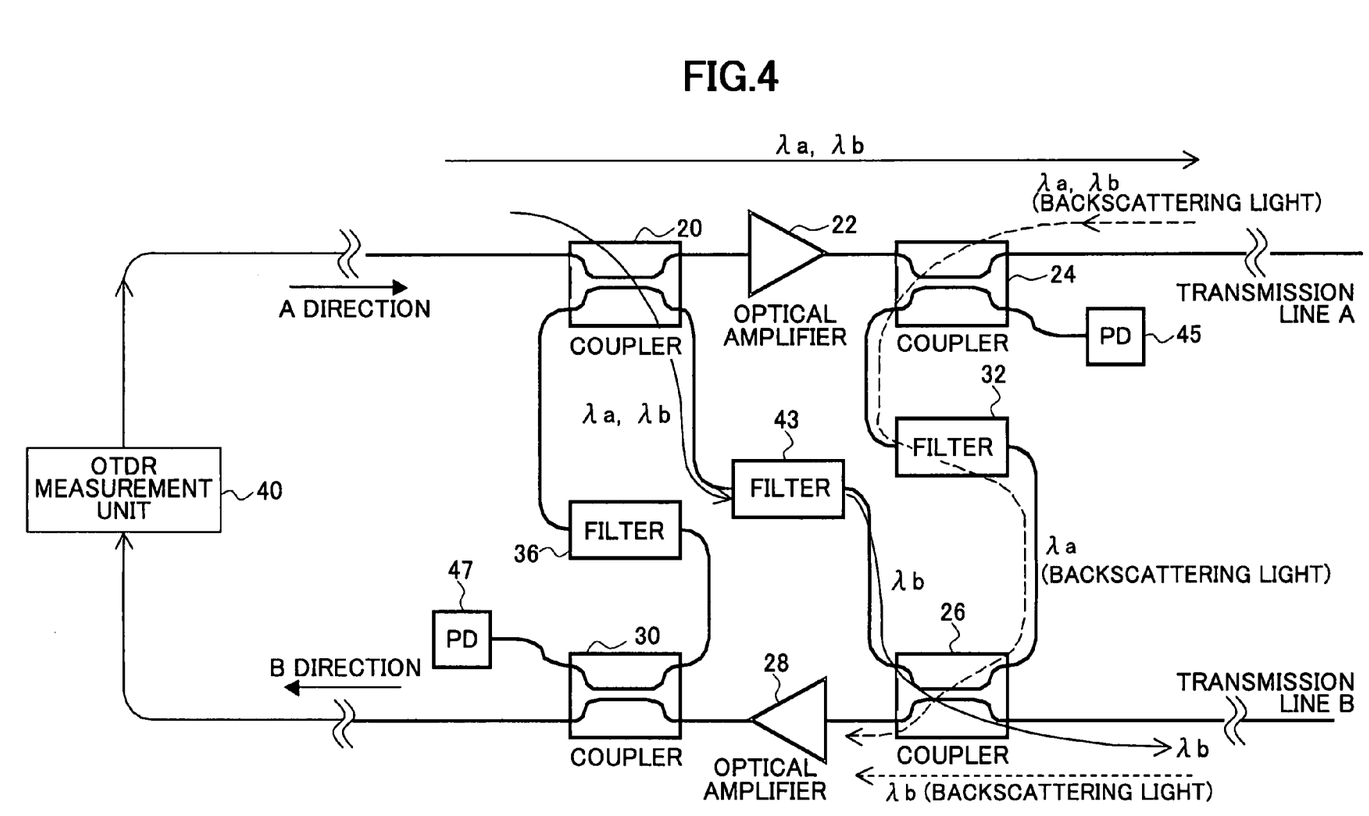
FIG. 4 is a configuration diagram of a third embodiment of an optical amplifying and repeating system according to the present invention.

FIG. 4 shows a configuration of a third embodiment of an optical amplifying and repeating system according to the present invention. In this embodiment, contrary to the second embodiment, backscattering light of the wavelength λb is not amplified. In the figure, the same reference numerals are given to the same parts/components as those of FIG. 2. In FIG. 4, wavelengths λa and λb traveling in an A direction in a transmission line A after being transmitted from the station A passes through an optical coupler 20, an optical amplifier 22 and an optical coupler 24, further travels in the A direction in the transmission line A, and then is transmitted to the B station. Further, wavelengths λa and λb traveling in a B direction in a transmission line B after being transmitted from the station B passes through an optical coupler 26, an optical amplifier 28 and an optical coupler 30, further travels in the B direction in the transmission line B, and then is transmitted to the A station.

Backscattering light of the wavelength λa transmitted from the A station in the transmission line A is taken from the transmission line A by means of the optical coupler 24 immediately after the optical amplifier 22, and is coupled in the optical transmission line B (opposite line) immediately before the optical amplifier 28 through an optical filter 32 which passes therethrough only the wavelength λa (or blocks the wavelength λb) in such a manner as to travel in the direction B of the transmission line B by means of the optical coupler 26.

The wavelength λb transmitted from the A station to the transmission line A is taken from the transmission line A by means of the optical coupler 20, and is coupled in the optical transmission line B (opposite line) immediately before the optical amplifier 28 through an optical filter 43 which passes therethrough only the wavelength λb (or blocks the wavelength λa) in such a manner that the wavelength λb travels in the direction A of the transmission line B by means of the optical coupler 26. Backscattering light of the wavelength λb coupled in the A direction of the transmission line B travels in the transmission line B in the B direction.

Thereby, it is possible to monitor a longitudinal directional loss distribution in both directions of the transmission lines A and B by means of the OTDR measurement unit 40 of the A station by transmitting the wavelengths λa and λb in the direction A of the transmission line A from the OTDR measurement unit 40.

Backscattering light of the wavelength λa transmitted from the B station in the transmission line B is taken from the transmission line B by means of the optical coupler 30 immediately after the optical amplifier 28, and is coupled in the optical transmission line A (opposite line) immediately before the optical amplifier 22 through an optical filter 36 which passes therethrough only the wavelength λa (or blocks the wavelength λb) in such a manner as to travel in the direction A of the transmission line A by means of the optical coupler 20.

The wavelength λb transmitted from the B station to the transmission line B is taken from the transmission line B by means of the optical coupler 26, and is coupled in the optical transmission line A (opposite line) immediately before the optical amplifier 22 through the optical filter 43 which passes therethrough only the wavelength λb (or blocks the wavelength λa) in such a manner that the wavelength λb travels in the direction B of the transmission line A by means of the optical coupler 20. Backscattering light of the wavelength λb coupled in the B direction of the transmission line A travels in the transmission line A in the A direction.

Thereby, it is possible to monitor a longitudinal directional loss distribution in both directions of the transmission lines A and B by means of an OTDR measurement unit of the B station, not shown, by transmitting the wavelengths λa and λb in the direction B of the transmission line B from the OTDR measurement unit of the B station.

In this embodiment, in comparison to the first embodiment, it is possible to eliminate one filter. However, the backscattering light of the wavelength λb is not amplified by the optical amplifier 22 or 28. Further, by configuring the optical filters 32 and 36 so that they may have characteristics to pass therethrough the wavelength λa with reflecting wavelengths other than the wavelength λa, it is possible to add photodiodes (PD) 45 and 47 in remaining ports of the optical couplers 24 and 30, it is possible to detect output power of the respective ones of the optical amplifiers 22 and 28 by means of the photodiodes 45 and 47, and the detection outputs can be utilized for gain control of the optical amplifiers 22 and 28.

Figure 5:
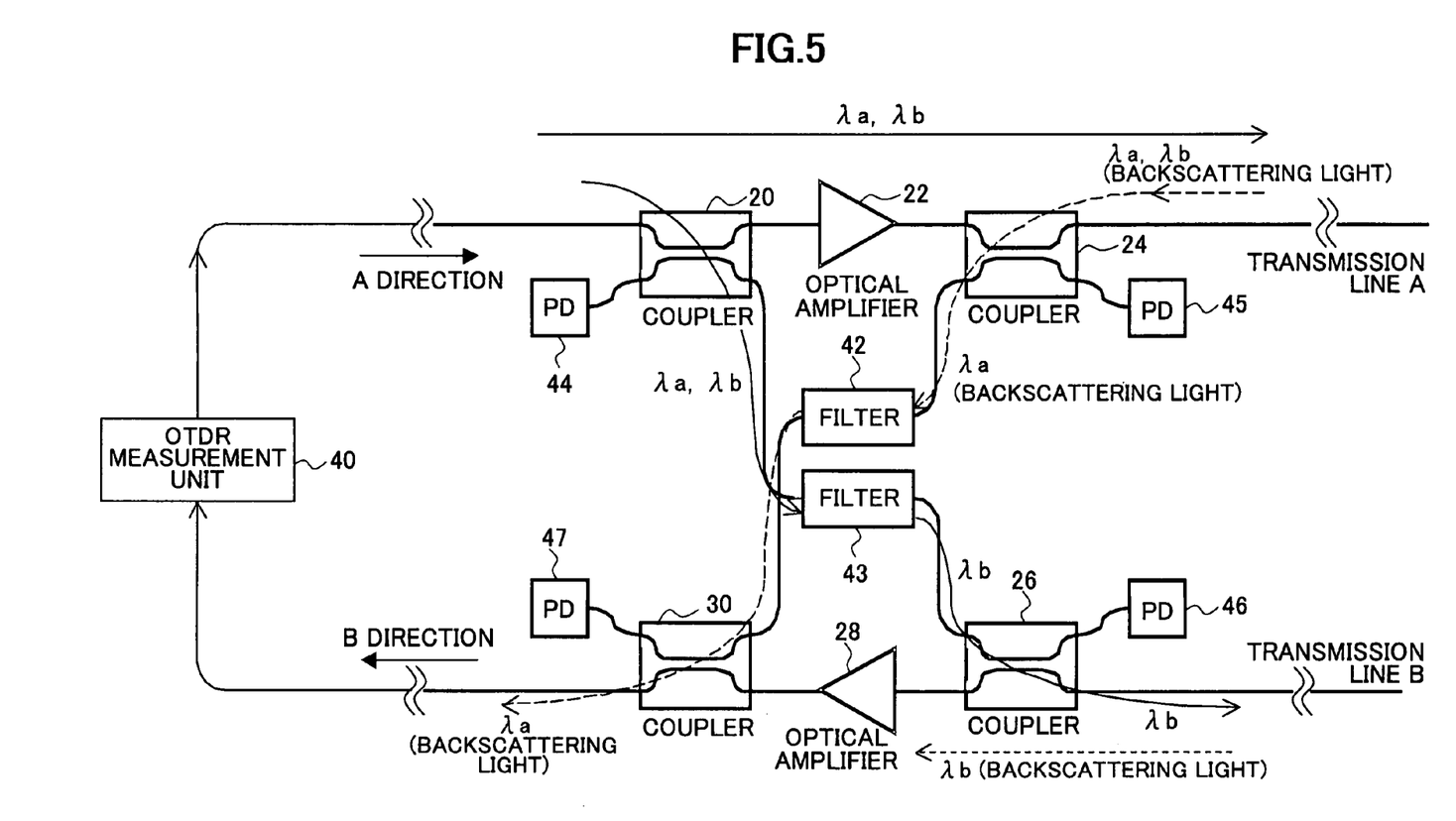
FIG. 5 is a configuration diagram of a fourth embodiment of an optical amplifying and repeating system according to the present invention.

FIG. 5 shows a configuration of a fourth embodiment of an optical amplifying and repeating system according to the present invention. In the figure, the same reference numerals are given to the same parts/components as those of FIG. 3 or 4. In FIG. 5, wavelengths λa and λb traveling in an A direction in a transmission line A after being transmitted from the station A passes through an optical coupler 20, an optical amplifier 22 and an optical coupler 24, further travels in the A direction in the transmission line A, and then is transmitted to the B station. Further, wavelengths λa and λb traveling in a B direction in a transmission line B after being transmitted from the station B passes through an optical coupler 26, an optical amplifier 28 and an optical coupler 30, further travels in the B direction in the transmission line B, and then is transmitted to the A station.

Backscattering light of the wavelength λa transmitted from the A station in the transmission line A is taken from the transmission line A by means of the optical coupler 24 immediately after the optical amplifier 22, and is coupled in the optical transmission line B (opposite line) immediately after the optical amplifier 28 through the optical filter 42 which passes therethrough only the wavelength λa (or blocks the wavelength λb) in such a manner as to travel in the direction B of the transmission line B by means of the optical coupler 30.

The wavelength λb transmitted from the A station to the transmission line A is taken from the transmission line A by means of the optical coupler 20, and is coupled in the optical transmission line B (opposite line) immediately before the optical amplifier 28 through the optical filter 43 which passes therethrough only the wavelength λb (or blocks the wavelength λa) in such a manner that the wavelength λb travels in the direction A of the transmission line B by means of the optical coupler 26. Backscattering light of the wavelength λb coupled in the A direction of the transmission line B travels in the transmission line B in the B direction.

Thereby, it is possible to monitor a longitudinal directional loss distribution in both directions of the transmission lines A and B by means of the OTDR measurement unit 40 of the A station by transmitting the wavelengths λa and λb in the direction A of the transmission line A from the OTDR measurement unit 40.

Backscattering light of the wavelength λa transmitted from the B station in the transmission line B is taken from the transmission line B by means of the optical coupler 30 immediately after the optical amplifier 28, and is coupled in the optical transmission line A (opposite line) immediately after the optical amplifier 22 through the optical filter 42 which passes therethrough only the wavelength λa (or blocks the wavelength λb) in such a manner as to travel in the direction A of the transmission line A by means of the optical coupler 24.

The wavelength λb transmitted from the B station to the transmission line B is taken from the transmission line B by means of the optical coupler 26, and is coupled in the optical transmission line A (opposite line) immediately before the optical amplifier 22 through the optical filter 43 which passes therethrough only the wavelength λb (or blocks the wavelength λa) in such a manner that the wavelength λb travels in the direction B of the transmission line A by means of the optical coupler 20. Backscattering light of the wavelength λb coupled in the B direction of the transmission line A travels in the transmission line A in the A direction.

Thereby, it is possible to monitor a longitudinal directional loss distribution in both directions of the transmission lines A and B by means of an OTDR measurement unit of the B station, not shown, by transmitting the wavelengths λa and λb in the direction B of the transmission line B from the OTDR measurement unit of the B station.

In this embodiment, in comparison to the first embodiment, it is possible to eliminate two filters. However, the backscattering light of the wavelengths λa and λb is not amplified by the optical amplifier 22 or 28. Further, it is possible to add photodiodes (PD) 44 through 47 in remaining ports of the optical couplers 20, 24, 26 and 30, it is possible to detect input/output power of the respective ones of the optical amplifiers 22 and 28 by means of the photodiodes 44 through 47, and the detection outputs can be utilized for gain control of the optical amplifiers 22 and 28.

Figure 6:
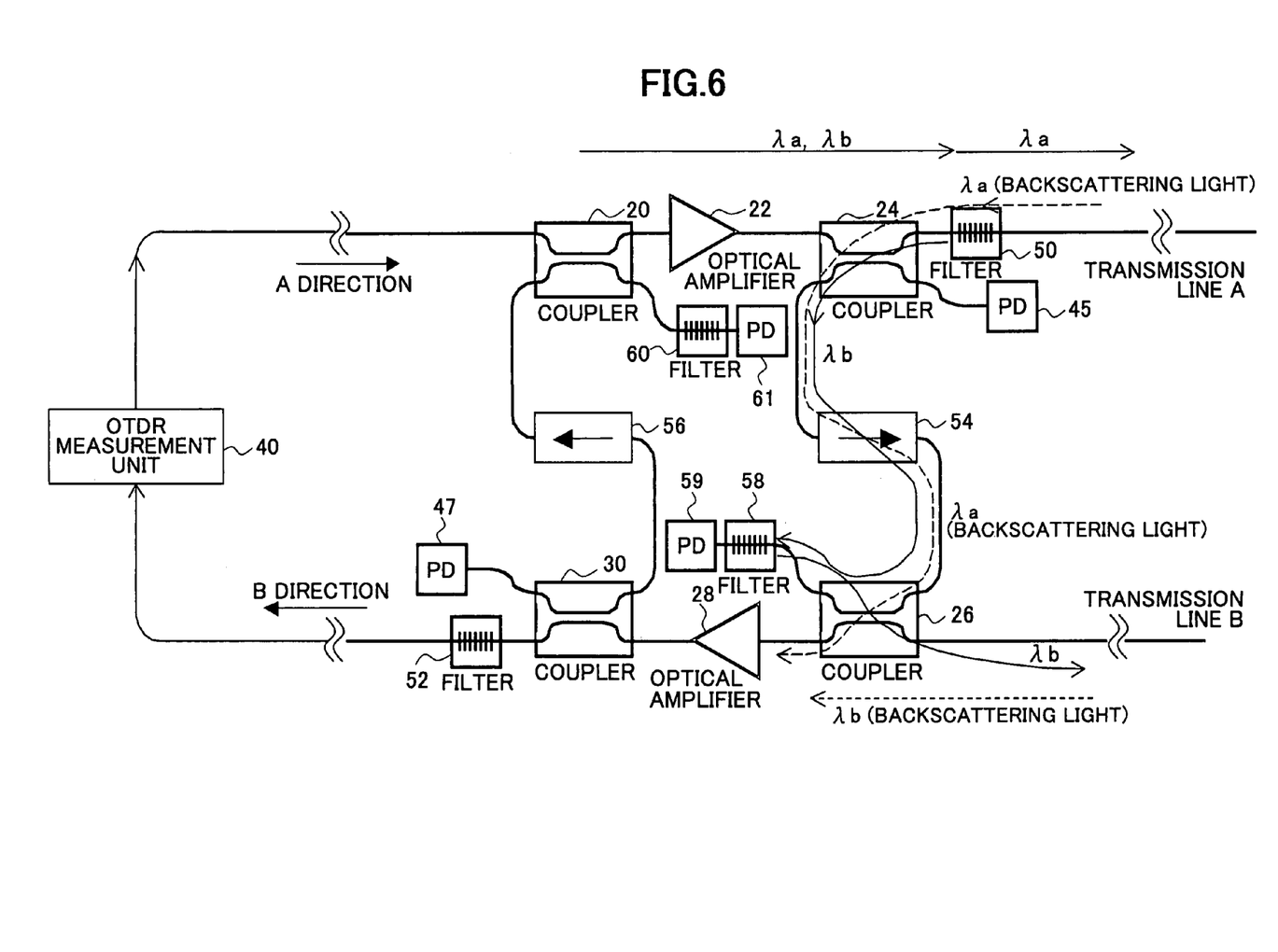
FIG. 6 is a configuration diagram of a fifth embodiment of an optical amplifying and repeating system according to the present invention.

FIG. 6 shows a configuration of a fifth embodiment of an optical amplifying and repeating system according to the present invention. In the figure, the same reference numerals are given to the same parts as those of FIGS. 2 through 5. In FIG. 6, wavelengths λa and λb traveling in an A direction (a direction in which light travels from an A station to a B station) in a transmission line A (a transmission line in which light travels from the A station to the B station) after being transmitted from the station A passes through an optical coupler 20, an optical amplifier 22 and an optical coupler 24, passes through an optical filter 50 and travels in the A direction in the transmission line A. The optical filter 50 has characteristics to reflect only the wavelength λb with passing therethrough wavelengths other than the wavelength λb.

Further, wavelengths λa and λb traveling in a B direction (a direction in which light travels from the B station to the A station) in a transmission line B (a transmission line in which light travels from the B station to the A station) after being transmitted from the station B passes through an optical coupler 26, an optical amplifier 28 and an optical coupler 30, passes through an optical filter 52, and travels in the B direction in the transmission line B. The optical filter 52 has characteristics to reflect only the wavelength λa with passing therethrough wavelengths other than the wavelength λa.

Backscattering light of the wavelength λa transmitted from the A station in the transmission line A is taken from the transmission line A by means of the optical coupler 24 immediately after the optical amplifier 22, and is coupled in the optical transmission line B (opposite line) immediately before the optical amplifier 28 through an optical isolator 54 which passes therethrough only light directed to the optical coupler 26 from the optical coupler 24 in such a manner as to travel in the direction B of the transmission line B by means of the optical coupler 26.

The wavelength λb transmitted from the A station to the transmission line A is reflected by the optical filter 50, is taken from the transmission line A by means of the optical coupler 24, and travels to a photodiode 59 through an optical filter 58 after passing through the optical isolator 54 and the optical coupler 26. The optical filter 58 has characteristics such as to reflect only the wavelength λb, with passing therethrough wavelengths other than the wavelength λb. The wavelength λb reflected by the optical filter 58 is coupled in the transmission line B (opposite line) immediately before the optical amplifier 28 in such a manner as to travel in the A direction of the transmission line B by means of the optical coupler 26. Backscattering light of the wavelength λb coupled in the A direction of the transmission line B travels in the transmission line B in the B direction.

Thereby, it is possible to monitor a longitudinal directional loss distribution in both directions of the transmission lines A and B by means of the OTDR measurement unit 40 of the A station by transmitting the wavelengths λa and λb in the direction A of the transmission line A from the OTDR measurement unit 40.

Similarly, backscattering light of the wavelength λa transmitted from the B station in the transmission line B is taken from the transmission line B by means of the optical coupler 30 immediately after the optical amplifier 28, and is coupled in the optical transmission line A (opposite line) immediately before the optical amplifier 22 through an optical isolator 56 which passes therethrough only light directed to the optical coupler 20 from the optical coupler 30 in such a manner as to travel in the direction A of the transmission line A by means of the optical coupler 20.

The wavelength λb transmitted from the B station to the transmission line B is reflected by the optical filter 52, is taken from the transmission line B by means of the optical coupler 30, and travels to a photodiode 61 through an optical filter 60 after passing through the optical isolator 56 and the optical coupler 20. The optical filter 60 has characteristics such as to reflect only the wavelength λb with passing therethrough wavelengths other than the wavelength λb. The wavelength λb reflected by the optical filter 60 is coupled in the transmission line A (opposite line) immediately before the optical amplifier 22 in such a manner as to travel in the B direction of the transmission line A by means of the optical coupler 20. Backscattering light of the wavelength λb coupled in the B direction of the transmission line A travels in the transmission line A in the A direction.

Thereby, it is possible to monitor a longitudinal directional loss distribution in both directions of the transmission lines A and B by means of an OTDR measurement unit of the B station, not shown, by transmitting the wavelengths λa and λb in the direction B of the transmission line B from the OTDR measurement unit of the B station. The optical isolators 54 and 56 should not necessarily be provided.

In this embodiment, it is possible to add photodiodes 45 and 47 in remaining ports of the optical couplers 24 and 30, it is possible to add photodiodes 59 and 61 in the rear of the optical filters 58 and 60, it is possible to detect input/output power of the respective ones of the optical amplifiers 22 and 28, and the detection outputs can be utilized for gain control of the optical amplifiers 22 and 28.

Figure 7:
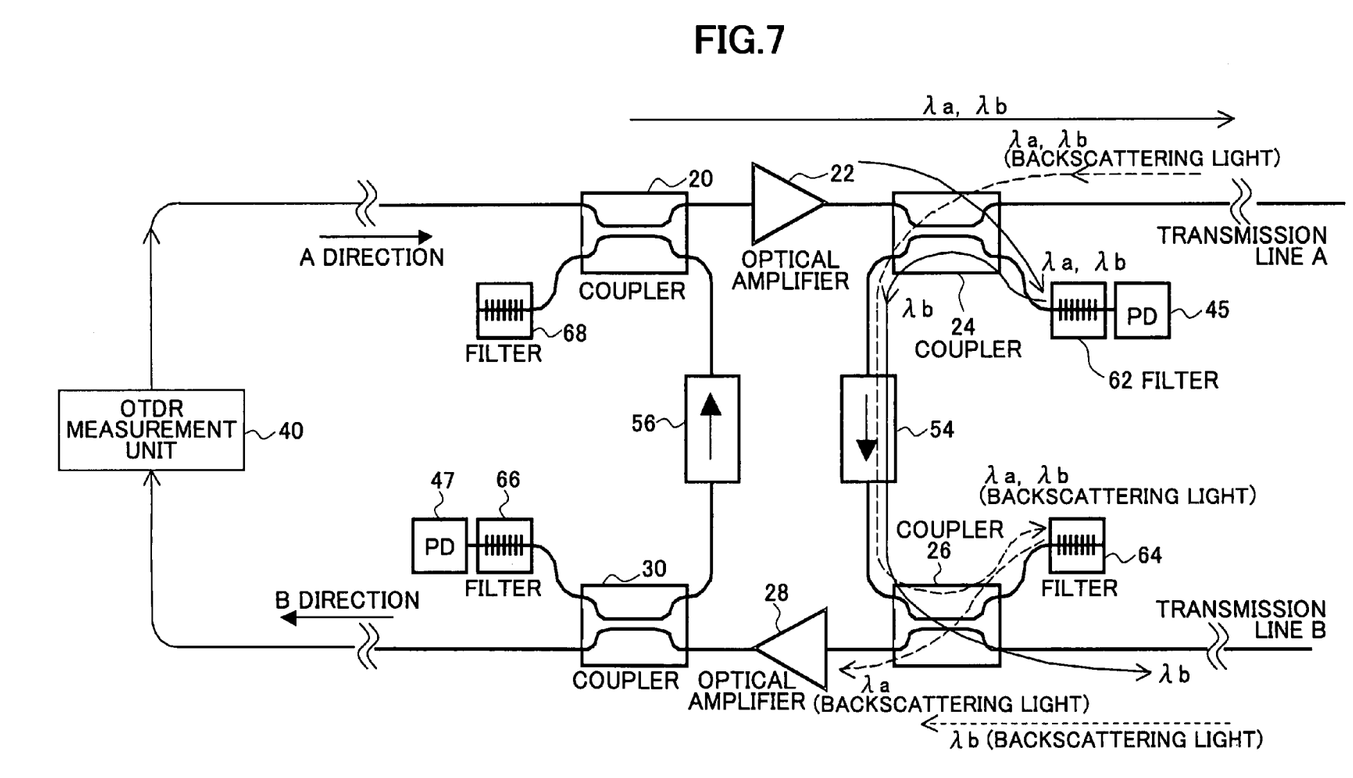
FIG. 7 is a configuration diagram of a sixth embodiment of an optical amplifying and repeating system according to the present invention.

FIG. 7 shows a configuration of a sixth embodiment of an optical amplifying and repeating system according to the present invention. In the figure, the same reference numerals are given to the same parts as those of FIGS. 2 through 6. In FIG. 7, wavelengths λa and λb traveling in an A direction (a direction in which light travels from an A station to a B station) in a transmission line A (a transmission line in which light travels from the A station to the B station) after being transmitted from the station A passes through an optical coupler 20, an optical amplifier 22 and an optical coupler 24, and travels in the A direction in the transmission line A, and then is transmitted to the B station.

Further, wavelengths λa and λb traveling in a B direction (a direction in which light travels from the B station to the A station) in a transmission line B (a transmission line in which light travels from the B station to the A station) after being transmitted from the station B passes through an optical coupler 26, an optical amplifier 28 and an optical coupler 30, and travels in the B direction in the transmission line B, and then is transmitted to the A station.

Backscattering light of the wavelength λa transmitted from the A station in the transmission line A is taken from the transmission line A by means of the optical coupler 24 immediately after the optical amplifier 22, and travels to an optical filter 64 through the optical coupler 26 after passing through an optical isolator 54 which passes therethrough only light directed to the optical coupler 26 from the optical coupler 24 immediately before the optical amplifier 28 of the optical transmission line B (opposite line). The optical filter 64 has characteristics such as to reflect only the wavelength λa, and passes therethrough wavelengths other than the wavelength λa. The above-mentioned backscattering light of the wavelength λa reflected by the optical filter 64 is coupled in such a manner as to travel in the B direction of the transmission line B by means of the optical coupler 26.

The wavelength λb transmitted from the A station to the transmission line A is taken by the optical coupler 24 from the transmission line A, and travels to a photodiode 45 through an optical filter 62 from the optical coupler 24. The optical filter 62 has characteristics such as to reflect only the wavelength λb with passing therethrough wavelengths other than the wavelength λb. The above-mentioned wavelength λb reflected by the optical filter 62 is coupled in such a manner as to travel in the A direction of the transmission line B by means of the optical coupler 26 immediately before the optical amplifier 28 of the optical transmission line B (opposite line) through the optical coupler 24 and the optical isolator 54. Backscattering light of the wavelength λb coupled in the A direction of the transmission line B travels in the B direction of the transmission line B.

Thereby, it is possible to monitor a longitudinal directional loss distribution in both directions of the transmission lines A and B by means of the OTDR measurement unit 40 of the A station by transmitting the wavelengths λa and λb in the direction A of the transmission line A from the OTDR measurement unit 40.

Similarly, backscattering light of the wavelength λa transmitted from the B station in the transmission line B is taken from the transmission line B by means of the optical coupler 30 immediately after the optical amplifier 28, and travels to an optical filter 68 through the optical coupler 20 after passing through an optical isolator 56 which passes therethrough only light directed to the optical coupler 20 from the optical coupler 30 immediately before the optical amplifier 22 of the optical transmission line A (opposite line). The optical filter 68 has characteristics such as to reflect only the wavelength λa, and pass therethrough wavelengths other than the wavelength λa. The above-mentioned backscattering light of the wavelength λa reflected by the optical filter 68 is coupled in such a manner as to travel in the A direction of the transmission line A by means of the optical coupler 20.

The wavelength λb transmitted from the B station to the transmission line B is taken by the optical coupler 30 from the transmission line B, and travels to a photodiode 47 through an optical filter 66 from the optical coupler 30. The optical filter 66 has characteristics such as to reflect only the wavelength λb with passing therethrough wavelengths other than the wavelength λb. The above-mentioned wavelength λb reflected by the optical filter 66 is coupled in such a manner as to travel in the B direction of the transmission line A by means of the optical coupler 20 immediately before the optical amplifier 22 of the optical transmission line A (opposite line) through the optical coupler 30 and the optical isolator 56. Backscattering light of the wavelength λb coupled in the B direction of the transmission line A travels in the A direction of the transmission line A.

Thereby, it is possible to monitor a longitudinal directional loss distribution in both directions of the transmission lines A and B by means of an OTDR measurement unit of the B station, not shown, by transmitting the wavelengths λa and λb in the direction B of the transmission line B from the OTDR measurement unit of the B station.

In this embodiment, it is possible to add photodiodes 45 and 47 in the rear of the optical filters 62 and 66, it is possible to detect output power of the respective ones of the optical amplifiers 22 and 28, and the detection outputs can be utilized for gain control of the optical amplifiers 22 and 28.

By applying optical circulators instead of the optical isolators 54 and 56, and adding photodiodes in ports to receive light applied in the opposite direction, it is possible to detect input power of the optical amplifiers. Further, in the present optical amplifying and repeating system, by configuring the optical couplers in the input sides of the optical amplifiers in two stages and adding monitoring photodiodes, it is possible to monitor input power of the optical amplifiers.

Figure 8:
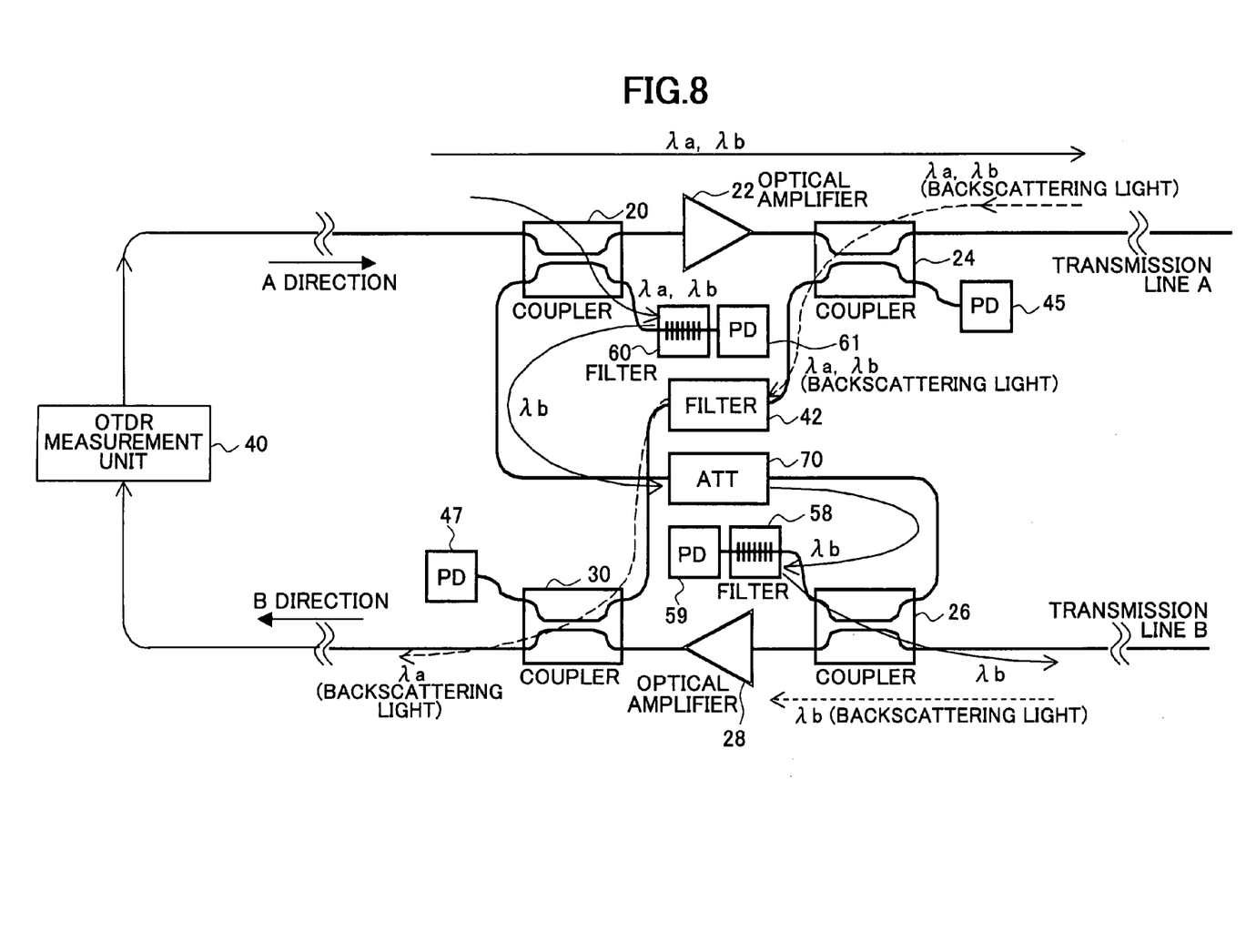
FIG. 8 is a configuration diagram of a seventh embodiment of an optical amplifying and repeating system according to the present invention.

FIG. 8 shows a configuration of a seventh embodiment of an optical amplifying and repeating system according to the present invention. In the figure, the same reference numerals are given to the same parts as those of FIGS. 2 through 7. In FIG. 8, wavelengths λa and λb traveling in an A direction (a direction in which light travels from an A station to a B station) in a transmission line A (a transmission line in which light travels from the A station to the B station) after being transmitted from the station A passes through an optical coupler 20, an optical amplifier 22 and an optical coupler 24, and travels in the A direction in the transmission line A, and then is transmitted to the B station.

Further, wavelengths λa and λb traveling in a B direction (a direction in which light travels from the B station to the A station) in a transmission line B (a transmission line in which light travels from the B station to the A station) after being transmitted from the station B passes through an optical coupler 26, an optical amplifier 28 and an optical coupler 30, and travels in the B direction in the transmission line B, and then is transmitted to the A station.

Backscattering light of the wavelength λa transmitted from the A station in the transmission line A is taken from the transmission line A by means of the optical coupler 24 immediately after the optical amplifier 22, and is coupled in the optical transmission line B (opposite line) immediately after the optical amplifier 28 through an optical filter 42 passing therethrough only wavelength λa (or blocking the wavelength λb) in such a manner as to travel in the direction B of the transmission line B by means of the optical coupler 30.

The wavelength λb transmitted from the A station to the transmission line A is taken from the transmission line A by means of the optical coupler 20, and travels to a photodiode 61 from an optical filter 60. The optical filter 60 has characteristics such as to reflect only the wavelength λb, with passing therethrough wavelengths other than the wavelength λb. The wavelength λb reflected by the optical filter 60 is attenuated by an optical attenuator (ATT) 70, and travels to a photodiode 59 from an optical filter 58 after passing through the optical coupler 26. The attenuator 70 is provided for the purpose of avoiding multipath reflection. The optical filter 58 has characteristics to reflect only the wavelength λb with passing therethrough wavelengths other than the wavelength λb. The wavelength λb reflected by the optical filter 58 is coupled in the transmission line B (opposite line) immediately before the optical amplifier 28 in such a manner as to travel in the A direction of the transmission line B by means of the optical coupler 26. Backscattering light of the wavelength λb coupled in the A direction of the transmission line B travels in the transmission line B in the B direction.

Thereby, it is possible to monitor a longitudinal directional loss distribution in both directions of the transmission lines A and B by means of the OTDR measurement unit 40 of the A station by transmitting the wavelengths λa and λb in the direction A of the transmission line A from the OTDR measurement unit 40.

Similarly, backscattering light of the wavelength λa transmitted from the B station in the transmission line B is taken from the transmission line B by means of the optical coupler 30 immediately after the optical amplifier 28, and is coupled in the optical transmission line A (opposite line) immediately after the optical amplifier 22 through an optical filter 42 passing therethrough only wavelength λa (or block the wavelength λb) in such a manner as to travel in the direction A of the transmission line A by means of the optical coupler 24.

Further, the wavelength λb transmitted from the B station to the transmission line B is taken from the transmission line B by means of the optical coupler 26, and travels to a photodiode 59 from an optical filter 58. The optical filter 58 has characteristics such as to reflect only the wavelength λb, with passing therethrough wavelengths other than the wavelength λb. The wavelength λb reflected by the optical filter 58 is attenuated by an optical attenuator (ATT) 70, and travels to a photodiode 61 from an optical filter 60 after passing through the optical coupler 20. The optical filter 60 has characteristics to reflect only the wavelength λb with passing therethrough wavelengths other than the wavelength λb. The wavelength λb reflected by the optical filter 60 is coupled in the transmission line A (opposite line) immediately before the optical amplifier 22 in such a manner as to travel in the B direction of the transmission line A by means of the optical coupler 20. Backscattering light of the wavelength λb coupled in the B direction of the transmission line A travels in the transmission line A in the A direction.

Thereby, it is possible to monitor a longitudinal directional loss distribution in both directions of the transmission lines A and B by means of the OTDR measurement unit 40 of the B station, not shown, by transmitting the wavelengths λa and λb in the direction B of the transmission line B from the OTDR measurement unit 40 of the B station.

In this embodiment, backscattering light of the wavelength λa is not amplified by the optical amplifier 22 or 28. Further, it is possible to add photodiodes 45 and 47 in remaining ports of the optical couplers 24 and 30, it is possible to add photodiodes 59 and 61 in the rear of the optical filters 58 and 60, it is possible to detect input/output power of the respective ones of the optical amplifiers 22 and 28, and the detection outputs can be utilized for gain control of the optical amplifiers 22 and 28.

The A station corresponds to a first station of the claims; the B station corresponds to a second station; the transmission line A corresponds to a first optical transmission line; the transmission line B corresponds to a second optical transmission line; the A direction corresponds to a first direction; the B direction corresponds to a second direction; the optical amplifier 22 corresponds to a first optical amplifier; and the optical amplifier 28 corresponds to a second optical amplifier.

What is claimed is:

1. An optical amplifying and repeating method for connecting between a first station and a second station with a first optical transmission line and a second optical transmission line, wherein:

said first optical transmission line transmits an optical signal in a first direction from the first station toward the second station and includes at least one first optical amplifier on the way; and said second optical transmission line transmits an optical signal in a second direction from the second station toward the first station and includes at least one second optical amplifier on the way, said method comprising:

taking backscattering light of a first wavelength traveling in the first direction of the first optical transmission line immediately after the first optical amplifier, and coupling the same in such a manner that said backscattering light may travel in the second direction of the second optical transmission line;

taking a second wavelength traveling in the first direction of the first optical transmission line and coupling the same in such a manner that the second wavelength may travel in the first direction of the second optical transmission line;

taking backscattering light of the first wavelength traveling in the second direction of the second optical transmission line immediately after the second optical amplifier, and coupling the same in such a manner that said backscattering light may travel in the first direction of the first optical transmission line; and taking the second wavelength traveling in the second direction of the second optical transmission line and coupling the same in such a manner that the second wavelength may travel in the second direction of the first optical transmission line.

2. An optical amplifying and repeating system for connecting between a first station and a second station with a first optical transmission line and a second optical transmission line, wherein:

said first optical transmission line transmits an optical signal in a first direction from the first station toward the second station and includes at least one first optical amplifier on the way; and said second optical transmission line transmits an optical signal in a second direction from the second station toward the first station and includes at least one second optical amplifier on the way, said system comprising:

a first optical circuit taking backscattering light of a first wavelength traveling in the first direction of the first optical transmission line immediately after the first optical amplifier, and coupling the same in such a manner that said backscattering light may travel in the second direction of the second optical transmission line;

a second optical circuit taking a second wavelength traveling in the first direction of the first optical transmission line and coupling the same in such a manner that the second wavelength may travel in the first direction of the second optical transmission line;

a third optical circuit taking backscattering light of the first wavelength traveling in the second direction of the second optical transmission line immediately after the second optical amplifier, and coupling the same in such a manner that said backscattering light may travel in the first direction of the first optical transmission line; and a fourth optical circuit taking the second wavelength traveling in the second direction of the second optical transmission line and coupling the same in such a manner that the second wavelength may travel in the second direction of the first optical transmission line.

3. The optical amplifying and repeating system as claimed in claim 2, wherein:

said first optical circuit comprises: a first optical coupler taking the backscattering light of the first wavelength traveling the first direction of the first optical transmission line from immediately after said first optical amplifier; a first optical filter receiving light from said first optical coupler and passing therethrough only the first wavelength; and a second optical coupler coupling light having passed through said first optical filter immediately before the second optical amplifier of the second optical transmission line in such a manner that said light may travel in the second direction;

said second optical circuit comprises: the first optical coupler taking the second wavelength traveling the first direction of the first optical transmission line; a second optical filter receiving light from said first optical coupler and passing therethrough only the second wavelength; and the second optical coupler coupling light having passed through said second optical filter immediately before the second optical amplifier of the second optical transmission line in such a manner that said light may travel in the first direction;

said third optical circuit comprises: a third optical coupler taking the backscattering light of the first wavelength traveling the second direction of the second optical transmission line from immediately after said second optical amplifier; a third optical filter receiving light from said third optical coupler and passing therethrough only the first wavelength; and a fourth optical coupler coupling light having passed through said third optical filter immediately before the first optical amplifier of the first optical transmission line in such a manner that said light may travel in the first direction; and said fourth optical circuit comprises: the third optical coupler taking the second wavelength traveling the second direction of the second optical transmission line; a fourth optical filter receiving light from said third optical coupler and passing therethrough only the second wavelength; and the fourth optical coupler coupling light having passed through said fourth optical filter immediately before the first optical amplifier of the first optical transmission line in such a manner that said light may travel in the second direction.

4. The optical amplifying and repeating system as claimed in claim 2, wherein:
said first optical circuit and said third optical circuit comprises: a fifth optical filter taking the backscattering light of the first wavelength traveling the first direction of the first optical transmission line from immediately after the first optical amplifier, and also, receiving the light from a first optical coupler and passing therethrough only the first wavelength; and the third optical coupler coupling the light having passed through the fifth optical filter immediately after the second optical amplifier of the second optical transmission line in such a manner that said light may travel in the second direction, and also, taking the backscattering light of the first wavelength traveling in the second direction of the second optical transmission line from immediately after the second optical amplifier;
said second optical circuit comprises: the first optical coupler taking the second wavelength traveling the first direction of the first optical transmission line; a second optical filter receiving the light from the first optical coupler and passing therethrough only the second wavelength; and a second optical coupler coupling the light having passed through the second optical filter immediately before the second optical amplifier of the second optical transmission line in such a manner that said light may travel in the first direction; and
said fourth optical circuit comprises: the third optical coupler taking the second wavelength traveling the second direction of the second optical transmission line; a fourth optical filter receiving the light from the third optical coupler and passing therethrough only the second wavelength; and a fourth optical coupler coupling the light having passed through the fourth optical filter immediately before the first optical amplifier of the first optical transmission line in such a manner that said light may travel in the second direction.

5. The optical amplifying and repeating system as claimed in claim 2, wherein:
said first optical circuit comprises: a first optical coupler taking backscattering light of the first wavelength traveling in the first direction of the first optical transmission line from immediately after the first optical amplifier; a first optical filter receiving light from the first optical coupler and passing therethrough only the first wavelength; and a second optical coupler coupling light having passed through the first optical filter immediately before the second optical amplifier of the second optical transmission line in such a manner that said light may travel in the second direction;
said second and fourth optical circuits comprise: a fourth optical coupler taking the second wavelength traveling in the first direction of the first optical transmission line from immediately before the first optical amplifier; a sixth optical filter receiving light from the fourth optical coupler, also receiving light from the second optical coupler and passing therethrough only the second wavelength; and the second optical coupler coupling light having passed through the sixth optical filter immediately before the second optical amplifier of the second optical transmission line in such a manner that said light may travel in the first direction, and also, taking the second wavelength traveling in the second direction of the second optical transmission line; and
said third optical circuit comprises: a third optical coupler taking backscattering light of the first wavelength traveling in the second direction of the second optical transmission line from immediately after the second optical amplifier; a third optical filter receiving light from the third optical coupler and passing therethrough only the first wavelength; and the fourth optical coupler coupling light having passed through the third optical filter immediately before the first optical amplifier of the first optical transmission line in such a manner that said light may travel in the first direction.

6. The optical amplifying and repeating system as claimed in claim 2, wherein:
said first and third optical circuits comprise: a first optical coupler taking the backscattering light of the first wavelength traveling in the first direction of the first optical transmission line from immediately after the first optical amplifier; a fifth optical filter receiving light from the first optical coupler, also receiving light from a third optical coupler and passing therethrough only the first wavelength; and the third optical coupler coupling light having passed through the fifth optical filter immediately after the second optical amplifier of the second optical transmission line in such a manner that said light may travel in the second direction, and also, taking the backscattering light of the first wavelength traveling in the second direction of the second optical transmission line from immediately after the second optical amplifier; and
said second and fourth optical circuits comprise: a fourth optical coupler taking the second wavelength traveling in the first direction of the first optical transmission line; a sixth optical filter receiving light from the fourth optical coupler, also receiving light from a second optical coupler and passing therethrough only the second wavelength; and the second optical coupler coupling light having passed through the sixth optical filter immediately before the second optical amplifier of the second optical transmission line in such a manner that said light may travel in the first direction, and also, taking the second wavelength traveling in the second direction of the second optical transmission line.

7. The optical amplifying and repeating system as claimed in claim 2, wherein:
said first optical circuit comprises: a first optical coupler taking the backscattering light of the first wavelength traveling in the first direction of the first optical transmission line; and a second optical coupler receiving light from the first optical coupler and coupling the same immediately before the second optical amplifier of the second optical transmission line in such a manner that said light may travel in the second direction;
said second optical circuit comprises: a seventh filter provided immediately after the first optical coupler of the first optical transmission line, reflecting the second wavelength and passing through wavelengths other than the second wavelength; the first optical coupler taking the second wavelength reflected by the seventh filter; an eighth filter receiving light from the first optical coupler, reflecting the second wavelength with passing therethrough wavelengths other than the second wavelength; and the second optical coupler coupling the second wavelength reflected by the eighth filter immediately before the second optical amplifier of the second optical transmission line in such a manner that it travels in the first direction;

said third optical circuit comprises: a third optical coupler taking the backscattering light of the first wavelength traveling in the second direction of the second optical transmission line; and a fourth optical coupler receiving light from the third optical coupler and coupling the same immediately before the first optical amplifier of the first optical transmission line in such a manner that said light may travel in the first direction; and said fourth optical circuit comprises: a ninth filter provided immediately after the third optical coupler of the second optical transmission line, reflecting the second wavelength with passing through wavelengths other than the second wavelength; the third optical coupler taking the second wavelength reflected by the ninth filter; a tenth filter receiving light from the third optical filter, reflecting the second wavelength with passing therethrough wavelengths other than the second wavelength; and the fourth coupler coupling the second wavelength reflected by the tenth filter immediately before the first optical amplifier of the first optical transmission line in such a manner that it travels in the second direction.

8. The optical amplifying and repeating system as claimed in claim 2, wherein:

said first optical circuit comprises: a first optical coupler taking the backscattering light of the first wavelength traveling the first direction of the first optical transmission line from immediately after said first optical amplifier; a first optical isolator causing light to pass from the first optical coupler for a second optical coupler; an eleventh filter receiving light from said first optical isolator and reflecting the first wavelength with passing therethrough wavelengths other than the first wavelength; and the second optical coupler coupling the backscattering light of the first wavelength reflected by the eleventh filter immediately before the second optical amplifier of the second optical transmission line in such a manner that said light may travel in the second direction;

said second optical circuit comprises: the first optical coupler taking the second wavelength traveling in the first direction of the first optical transmission line; a twelfth filter receiving light from said first optical coupler and reflecting the second wavelength with passing therethrough wavelengths other than the second wavelength; the first optical isolator causing the second wavelength reflected by the twelfth filter to pass from the first coupler for the second coupler; and the second optical coupler coupling the second wavelength from the first optical isolator immediately before the second optical amplifier of the second optical transmission line in such a manner that said light may travel in the first direction;

said third optical circuit comprises: a third optical coupler taking the backscattering light of the first wavelength traveling the second direction of the second optical transmission line from immediately after said second optical amplifier; a second optical isolator causing light to pass from the third optical coupler for a fourth optical coupler; a thirteenth optical filter receiving light from said second optical isolator and reflecting the first wavelength with passing therethrough wavelengths other than the first wavelength; and the fourth optical coupler coupling backscattering light of the first wavelength reflected by the thirteenth filter immediately before the first optical amplifier of the first optical transmission line in such a manner that said light may travel in the first direction; and said fourth optical circuit comprises: the third optical coupler taking the second wavelength traveling in the second direction of the second optical transmission line; a fourteenth filter receiving light from said third optical coupler and reflecting the second wavelength with passing therethrough wavelengths other than the second wavelength; the second optical isolator causing the second wavelength reflected by the fourteenth filter to pass from the third coupler for the fourth coupler; and the fourth optical coupler coupling the second wavelength from the second optical isolator immediately before the first optical amplifier of the first optical transmission line in such a manner that said light may travel in the second direction.

9. The optical amplifying and repeating system as claimed in claim 2, wherein:

said first and third optical circuits comprise: a first optical coupler taking the backscattering light of the first wavelength traveling in the first direction of the first optical transmission line from immediately after the first optical amplifier; a fifth optical filter receiving light from the first optical coupler, also receiving light from a third optical coupler and passing therethrough only the first wavelength; and the third optical coupler coupling light having passed through the fifth optical filter immediately after the second optical amplifier of the second optical transmission line in such a manner that said light may travel in the second direction, and also, taking the backscattering light of the first wavelength traveling in the second direction of the second optical transmission line from immediately after the second optical amplifier; and said second and fourth optical circuits comprise: a fourth optical coupler taking the second wavelength traveling in the first direction of the first optical transmission line; a fifteenth filter receiving light from the fourth optical coupler and reflecting the second wavelength with passing therethrough wavelengths other than the second wavelength; an optical attenuator attenuating light; a sixteenth filter receiving light from the optical attenuator, and reflecting the second wavelength with passing therethrough wavelengths other than the second wavelength, and a second optical coupler coupling the second wavelength reflected by the sixteenth filter immediately before the second optical amplifier of the second optical transmission line in such a manner that said light may travel in the first direction, and also, taking the second wavelength traveling in the second direction of the second optical transmission line.

10. The optical amplifying and repeating system as claimed in claim 4, wherein:

photodiodes are provided in vacant ports of the second and fourth optical couplers.

11. The optical amplifying and repeating system as claimed in claim 5, wherein:

photodiodes are provided in vacant ports of the first and third optical couplers.

12. The optical amplifying and repeating system as claimed in claim 6, wherein:

photodiodes are provided in vacant ports of the first through fourth optical couplers.

13. The optical amplifying and repeating system as claimed in claim 7, wherein:
   photodiodes are provided immediately after the eighth and tenth filters.

14. The optical amplifying and repeating system as claimed in claim 8, wherein:
   photodiodes are provided immediately after the eleventh and thirteenth filters.

15. The optical amplifying and repeating system as claimed in claim 9, wherein:
   photodiodes are provided immediately after the fifteenth and sixteenth filters.

16. The optical amplifying and repeating system as claimed in claim 8, wherein:
   optical circulators are applied instead of the first and second optical isolators, and photodiodes are provided in ports for receiving light applied in a reverse direction.

* * * * *